US007626737B2

(12) United States Patent
Patterson
(10) Patent No.: US 7,626,737 B2
(45) Date of Patent: Dec. 1, 2009

(54) WIDE FORMAT ROB ASSEMBLY

(75) Inventor: James W. Patterson, Newark, NY (US)

(73) Assignee: Xerox Corporation, Norwalk, CT (US)

(*) Notice: Subject to any disclaimer, the term of this patent is extended or adjusted under 35 U.S.C. 154(b) by 1020 days.

(21) Appl. No.: 11/094,966

(22) Filed: Mar. 31, 2005

(65) Prior Publication Data

US 2006/0227203 A1 Oct. 12, 2006

(51) Int. Cl.
*H04N 1/04* (2006.01)

(52) U.S. Cl. ....................... 358/474; 358/405; 358/493; 347/136; 250/208.1; 399/301

(58) Field of Classification Search ................. 358/474, 358/1.15, 448, 494, 450, 449, 451, 405, 406, 358/504; 346/107; 347/134, 136; 250/208.1; 399/301
See application file for complete search history.

(56) References Cited

U.S. PATENT DOCUMENTS 4,595,259 A * 6/1986 Perregaux ...................... 349/3
4,660,052 A * 4/1987 Kaiya et al. ................. 347/200
5,153,750 A 10/1992 Hiroi et al.
5,260,718 A * 11/1993 Rommelmann et al. ..... 347/136
5,526,141 A 6/1996 Ogura et al.
5,982,512 A 11/1999 Kim
6,005,587 A * 12/1999 Takahashi et al. ........... 715/733
6,015,200 A 1/2000 Ogura
6,417,508 B1 7/2002 Ogura et al.
6,469,808 B1 10/2002 Onishi et al.
6,476,369 B1 11/2002 Matsumoto
6,822,768 B1 * 11/2004 McCoy ........................ 358/498
6,839,155 B2 * 1/2005 Spencer ....................... 358/488
6,975,434 B1 * 12/2005 Pilu et al. ................... 358/474
7,136,199 B2 * 11/2006 Cantwell ..................... 358/474
7,502,147 B2 * 3/2009 Suzuki et al. ............... 358/504
2003/0081267 A1 * 5/2003 Cantwell ..................... 358/474

* cited by examiner

*Primary Examiner*—Houshang Safaipour
*Assistant Examiner*—Negussie Worku
(74) *Attorney, Agent, or Firm*—Pillsbury Winthrop Shaw Pittman LLP

(57) ABSTRACT

Wide format multiple ROB assembly. Raster Output Bar assembly comprises one or more individual image bars mounted onto their own sub-assemblies. Wide format ROB is assembled at the factory onto a datum structure from individual sub-assemblies staggered to achieve a desired wide format. The sub-assemblies are adjustably positioned on the datum structure based on the datums obtained off of the individual image bars. No further in-machine adjustments are needed in the field.

20 Claims, 7 Drawing Sheets

WIDE FORMAT ROB ASSEMBLY

BACKGROUND

All references cited in this specification, and their references, are incorporated by reference herein where appropriate for teachings of additional or alternative details, features and/or technical background.

Disclosed are methods to control slow and fast scan image bar output defects from a raster output bar (ROB) assembly to provide wide format imaging capability.

The use of addressable image bars as an imaging device in electrophotographic printing machines is known. An image bar is a construct utilizing imaging components such as liquid crystals or light emitting diodes to guide or direct light rays to from images. The commonly used image bars are linear substrates having an effective length equivalent to the width of the standard letter size documents, e.g., 8½ inches. It is also known that the longer the image bar length, the greater the difficulty of manufacturing and the greater the cost. The yield of these types of bars decreases exponentially with increased pixel density in active areas in a linear direction.

In order to obtain an image bar of an increased length in order to accommodate larger size documents, such as engineering drawings with widths up to 36 inches for example, one or more image bars of relatively shorter lengths are linearly aligned in a staggered orientation to form together an image bar of effectively increased length. However, these bars, in addition to being linearly aligned physically, also need to be optically aligned with their outputs focused to a common line at a photoreceptor. Even after all the alignments have been performed prior to the installation of the image bar in the machine, further in-machine adjustments, sometime in the field, are required, which result in down-time and costly maintenance. There is a need for methods to alleviate problems associated with alignment and adjustment of image bars by executing certain mechanical mounting and adjustment strategies on the manufacturing floor prior to delivering the image bar to the field.

A commonly used image bar assembly in an electrophotographic copier/printer combination is described in U.S. Pat. No. 5,260,718 as shown in FIG. 1. The multifunction machine 10 shown in the Figure incorporates an imaging system 20 with image bar assemblies 30 and 30'. Copying function is provided by the imaging system 20, while the printing function is provided by imaging systems 30 and 30' comprising image bar assemblies 35 and 35' and their associated lens system 40 and 40'. In either the copying or printing mode, the final output may be printed on a printer 50 as shown in FIG. 1.

In copying mode, a document 13 is transported across the surface of platen 15 by a commonly used CVT (Continuous Velocity Transport) means (not shown). The document is incrementally illuminated by illumination from a pair of light sources 25 and 25' energized by power supply 75 shown in FIG. 1. Light sources may comprise mercury lamps, fluorescent lamps, LEDs or a light source and a reflector. Light is reflected downward 23 and is imaged by Selfoc™ lens array (SLA) 20 onto a photoreceptor 55 (FIG. 1) on the surface of drum 53 creating a line by line exposure of the document and forming a latent image. As is known, printer 50 includes a series of process stations through which the photoreceptor drum 53 passes beginning with the image station 60 where the latent electrostatic image is formed. Drum 53 moves past development station 63, transfer station 65 where the image is transferred to paper and fused, to cleaning station 67, and to corona charging station 69 where the photoreceptor is charged.

When print mode is selected, imaging systems 30 and 30' are enabled and subsequently controlled by signals from systems controller 70. Imaging systems 30 and 30' comprise bar assemblies 35 and 35' and associated Selfoc™ lens array (LSA) 40 and 40', which are optically aligned along center line 37 and 37', respectively. The two sets of components aligned along center lines 37 and 37' form an angle θ and are sufficiently displaced from each other in their process direction to accommodate the copier imaging system 20 as shown in FIG. 1.

Light sources 25 and 25' illuminate assemblies 35 and 35', respectively. Bar assemblies 35 and 35' shown in FIG. 1 comprise liquid crystal type image bars although other types of image bars may also be used, such as LED image bars addressed by appropriate control means. Image bar 35 contains two liquid crystal image bars 35-*a*, 35-*c* and image bar 35' contains the other two complementary bars 35'-*b*, 35'-*d*. Image bars 35 and 35' are arranged to form staggered linear as shown in FIG. 2. Each image bar has two offset rows of linear liquid crystal pixels. The transmissive state of each image bar is determined by selective application of a voltage to a plurality of electrodes on the image bar substrate. Bar control circuit 73 energizes the appropriate electrodes in response to digitized bit-mapped data input representing document information typically sent from a charge coupled device or from a computer and stored in controller memory. Bar control circuitry 73 is described in U.S. Pat. No. 5,207,718, which is incorporated herein by reference in its entirety, and will not be discussed any further here in order not to unnecessarily obscure the significant aspects of the present disclosure.

Each bit of data is polarized ("1" or "0") to indicate whether the picture elements "pixels" it represents is to be printed black or white. Depending upon the individual liquid crystal shutter activation, image bars 35-*a*, 35'-*b*, 35-*c*, 35'-*d* selectively pass light through apertures 31 and 31' to a pair of linear gradient index lens arrays 40, 40', such as Selfoc™ SLA 12 lenses manufactured by Nippon Sheet Glass Company. The lenses image the light outputs (as two linear arrays of dots) from the staggered arrays as two lines at the photoreceptor surface.

It will be understood from the configuration shown in FIG. 2 that by staggering the image bars, and by using appropriately longer known gradient index lens arrays, images can be formed on the photoreceptor as being the sum of the length of each modulated image bar formed in the linear arrays. It will also be apparent that proper registration of the image bar will have to take place in the process and scan direction to ensure proper overlap at the ends of the bar to accommodate the required "stitching" of the several focused bar images. Referring to FIG. 3 there is shown a side perspective view of FIG. 1 showing three of the bars (35-*a*, 35'-*b*, 35-*c*) beneath light source 25. The Selfoc™ lens arrays have been omitted for clarity of description. The registration of the image bars in the process direction requires that: (1) the portions of the scan line projected from bar 35'-*b* align with the correct positions of scan lines projected from bars 35-*a* and 35-*c*, and (2) that the projected pixels do not overlap or leave a gap. As shown in FIG. 3 the raster formatted input data is recovered and stored in data buffer 80, located in bar control 73 shown in FIG. 1, and then read out in proper sequence to the three bars. It is evident that the data must be divided into three columns and directed to each of the three bars. Since the bars are multiplexed, i.e., each possesses two offset rows 90, 95 of pixels, with both energized at the same time and since these odd and even rows are offset, the data supplied are similarly offset. In order to obtain this offset, the data is read out of memory displaced by this offset, as shown. The data path is shown by reference numeral 100 while the optical merging direction is indicated by 110. Odd bits 120 and even bits 130 are allocated in buffer 80 as shown schematically in FIG. 3 where the displacement 140 of rows is the same as in the image bar. The raster line direction is shown by arrow 150.

The associated driving circuits and the functional representation of the image bars are described in U.S. Pat. No. 5,260,718 referenced above. Procedures for registration of the image bars in the scan direction are illustrated. Concerns related to overlapping of the bars are discussed. It is nevertheless experienced in the field that there can still be fast scan image bar output defects resulting from poor pixel stitching at the overlapping ends of the bars. Correction for these defects require in-machine adjustments in the field resulting in downtime and costly maintenance. What is needed is a method to fix the defects at the factory prior to the installation of the bars in the machine so that no further in-machine adjustments may be required in the field.

SUMMARY

Aspects disclosed herein include a method comprising providing a datum structure having a first set of adjustable datum openings; selecting at least one mounting bracket having a second set of datum openings and a third set of datum openings; selecting at least one image bar having a fourth set of datum openings; aligning the fourth set of datum openings of the image bar with the third set of datum openings of the mounting bracket; mounting and holding the image bar on the mounting bracket by inserting a first set of datum pins through the aligned fourth set of datum openings and third set of datum openings; aligning the second set of datum openings with the first set of adjustable datum openings on the datum structure; mounting and holding the mounting bracket on the datum structure by inserting a second set of datum pins through the aligned second set of datum openings on the mounting bracket and through the first set of adjustable datum openings on the datum structure; and positioning the image bar on the datum structure by slidably moving the second set of pins of the bracket in the first set of adjustable datum openings on the datum structure until end-to-end pixel stitching adjustment is achieved among one or more image bars covering the whole length of an electrophotographic photoreceptor; and an apparatus comprising a datum structure having two ends and a front surface and a back surface configured to receive one or more image bar assemblies; a roller assembly attached to the two ends of the datum structure the roller assembly configured to mate with a photoreceptor drum; at least one mounting bracket having a first surface and a second surface the first surface configured to receive an image bar forming an image bar assembly; wherein the one or more image bar assemblies are alternately mounted on the front and back surfaces of the datum structure at positions that provide longitudinal adjustment of end-to-end pixel stitching of the image bars over the photoreceptor drum.

DETAILED DESCRIPTION

In embodiments there is illustrated methods to control slow and fast scan image bar output defects that employ general mechanical mounting and adjustment strategies at the factory floor prior to field installation of the image bar into a scanner.

Figure 1:
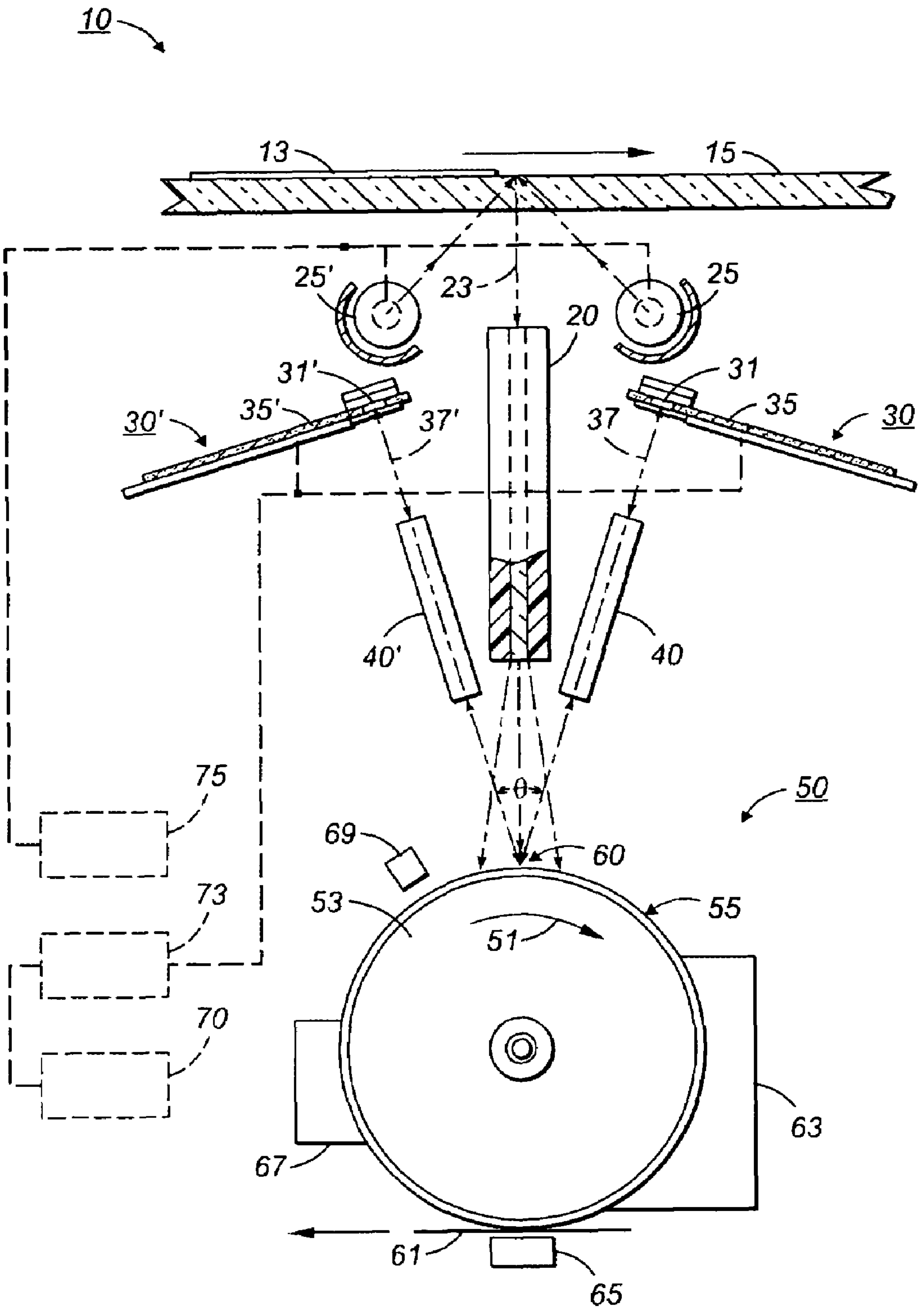
FIG. 1 (Prior Art)
FIG. 1 is a drawing showing an imaging system for an electrophotographic printer using image bars.
Figure 2:
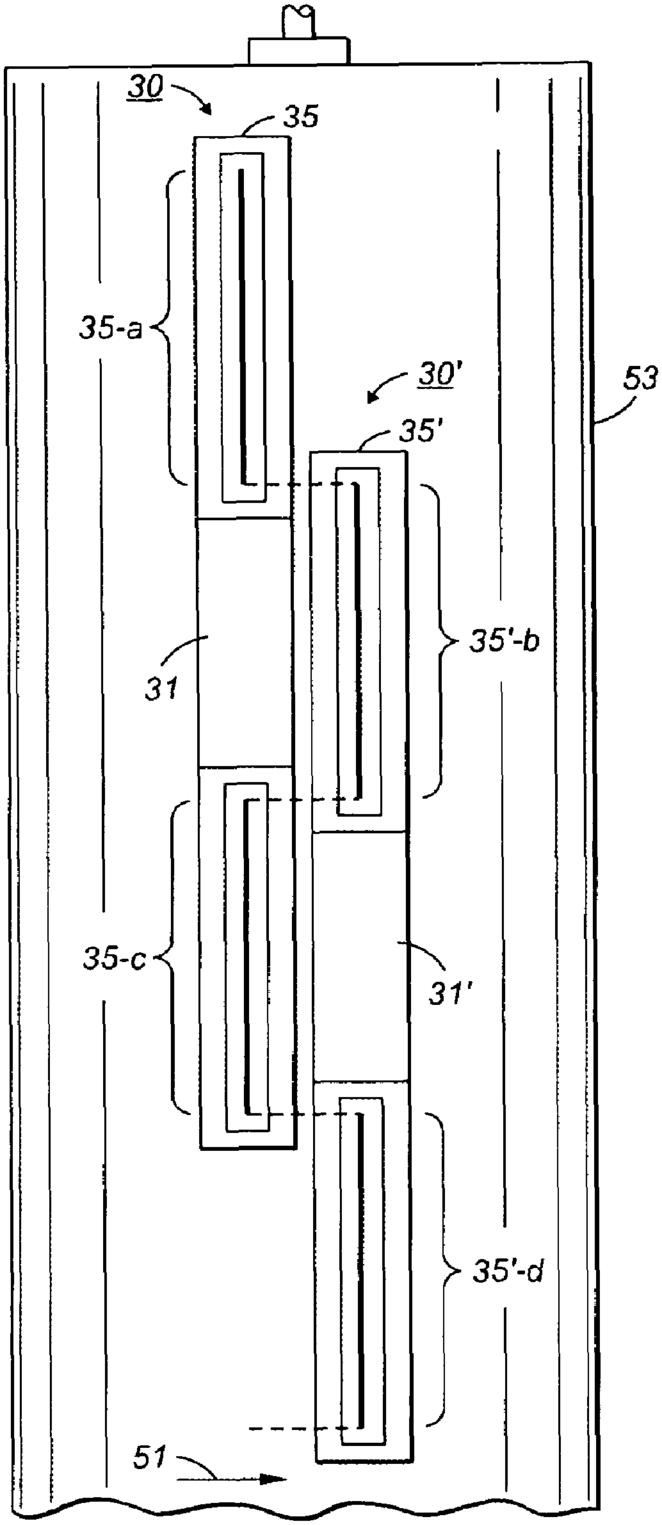
FIG. 2 (Prior Art)
FIG. 2 is a drawing showing the arrangement of a pair of image bars where the pixels are linearly staggered.
Figure 3:
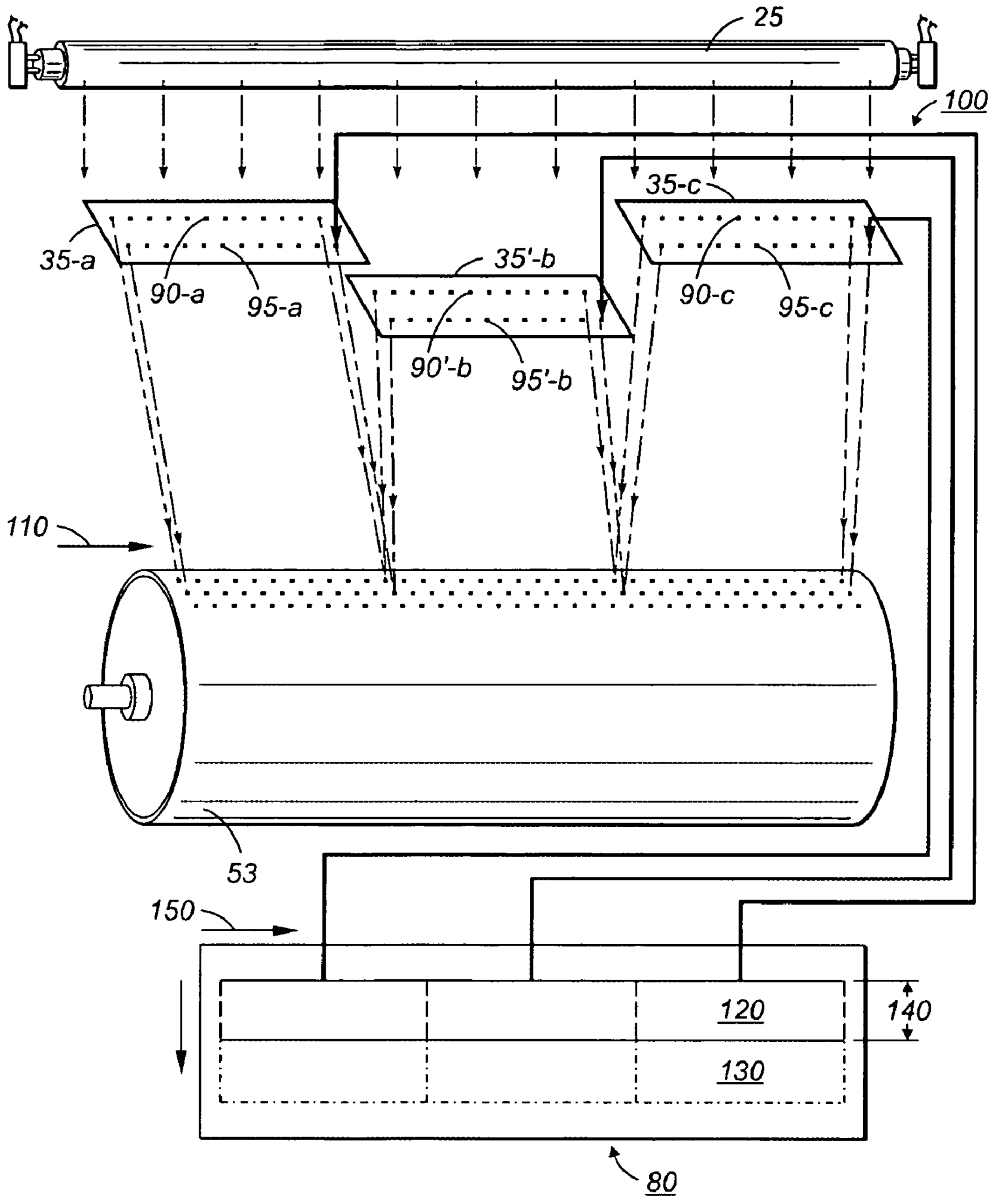
FIG. 3 (Prior Art)
FIG. 3 is a schematic drawing of the alignment of image bars of FIG. 2 showing the electronic end-to-end stitching of pixels focused on an electrophotographic imaging photoreceptor.
Figure 4:
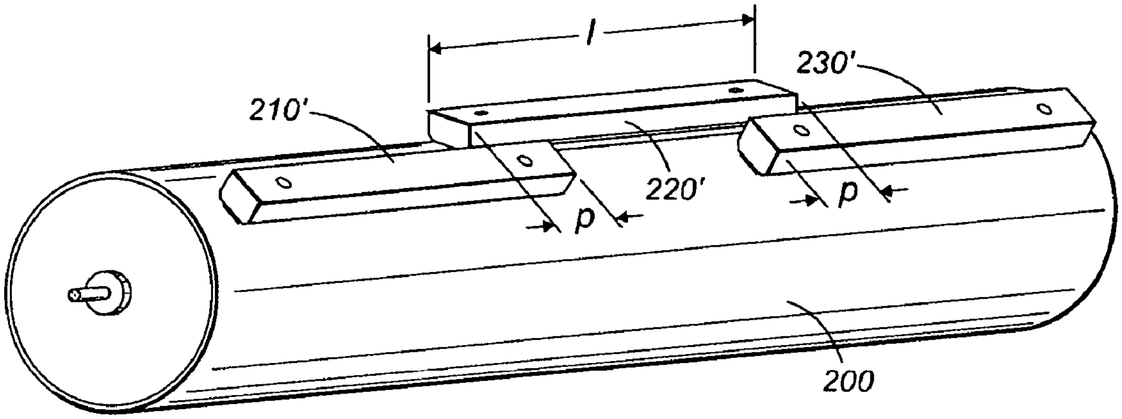
FIG. 4 is a perspective drawing of an embodiment showing a staggered arrangement of image bars over a photoreceptor defining the required wide area format.

FIG. 4 shows an embodiment of staggered image bars, 210', 220' and 230' disposed over a photoreceptor drum 200. Although three are shown for illustrative purposes, it will be understood that there is no limitation as to the number or size of the image bars. The arrangement shown in FIG. 4 defines the requirements for printing documents ranging from letter size to oversized engineering drawings. The increased widths are achieved by forming underlying substrates for image bars of a desired length and arranging a plurality of image bars in a staggered array sufficient to realize the desired length. For the case shown in FIG. 4, the overall length of the photoreceptor 200 is from about 24 to about 72 inches. The bars have a length 1 ranging from about 12 to about 39 inches. An adjustable overlap p from about 0.16 to 3 inches may be provided in order to obtain the desired longitudinal end-to-end pixel stitching and registration at the end of the bars, as was described earlier in reference to FIG. 3.

Figure 5:
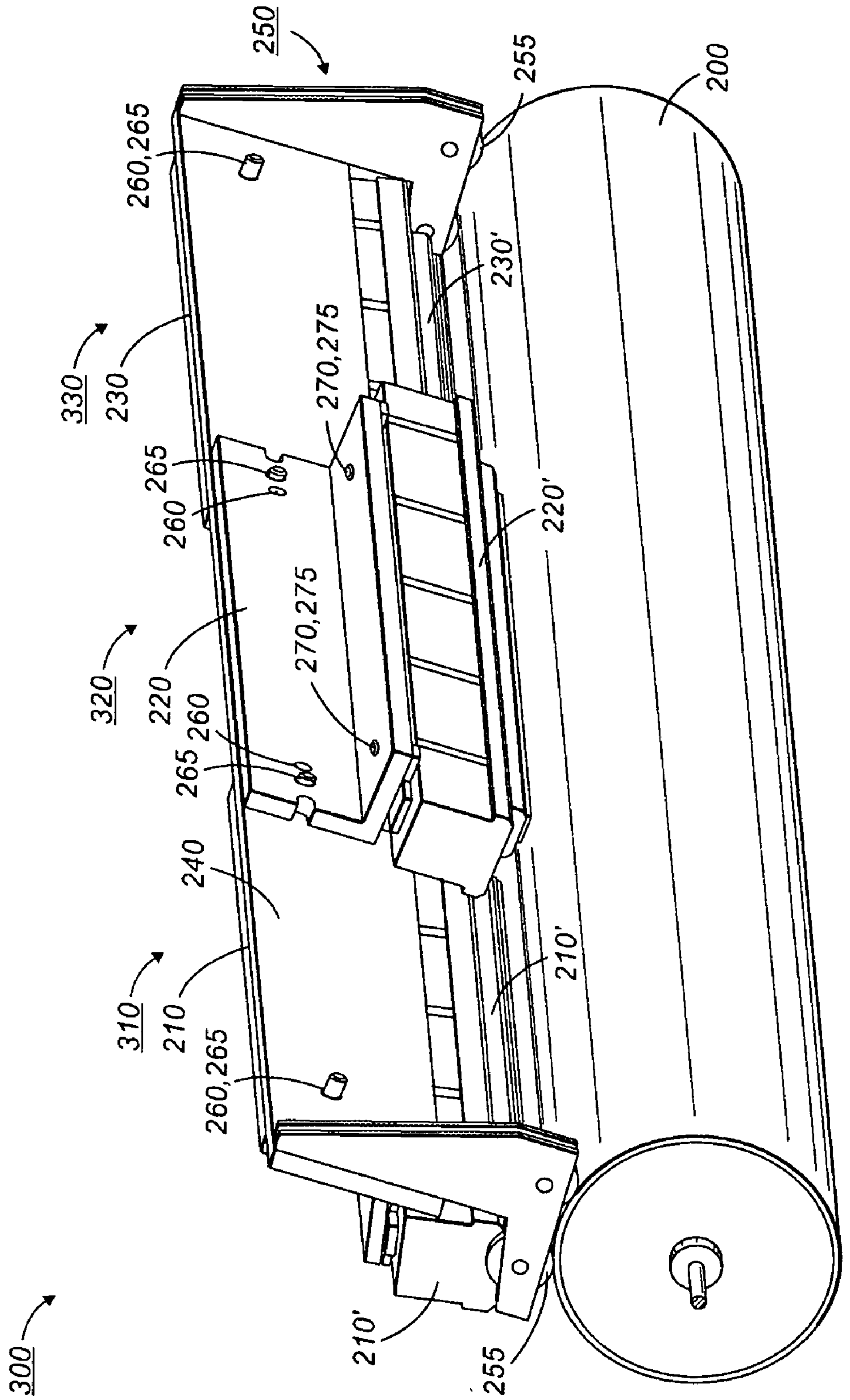
FIG. 5 is a drawing of an embodiment of a wide format multiple raster output bar (ROB) assembly showing a staggered arrangement of image bars on a datum structure on rollers such that the assembly does not require any in-machine adjustments in the field.

FIG. 5 shows an aspect of an embodiment where the individual image bars 210', 220' and 230' of FIG. 4 are mounted on individual mounting brackets 210, 220 and 230, forming individual image bar sub-assemblies 310, 320 and 330, respectively. The sub-assemblies are in turn mounted alternately onto front and back surfaces of a main datum structure 240, thus forming the multiple raster output bar (ROB) assembly 300 of this disclosure. It will be evident from FIG. 5 that the center bar sub-assembly 320 comprising the image bar 220' and the mounting bracket 220 faces the viewer while the other remaining two sub-assemblies 310 and 330 are on the back side or surface of the main datum structure 240 facing away from the viewer.

In another aspect, the main datum structure 240 is suspended from a roller assembly 250 having rollers 255. Rollers 255 provide positive traction on photoreceptor 200 as well as a predetermined focusing distance from the image bars to the photoreceptor. The rollers comprise, but not limited to plastic.

In still another aspect, the individual brackets 210, 220 and 230 have datum holes, or openings, 260 and pins 265 for mounting the image bars 210', 220' and 230' onto their respective brackets as well as for mounting the brackets onto the main datum structure 240 as shown in FIG. 5. Datum opening/pins for the main datum structure 240 in such FIG. 5 have been assigned the same reference numeral as the mating brackets to avoid excessive use of numerals. The same scheme is used for other mating parts.

Figure 6:
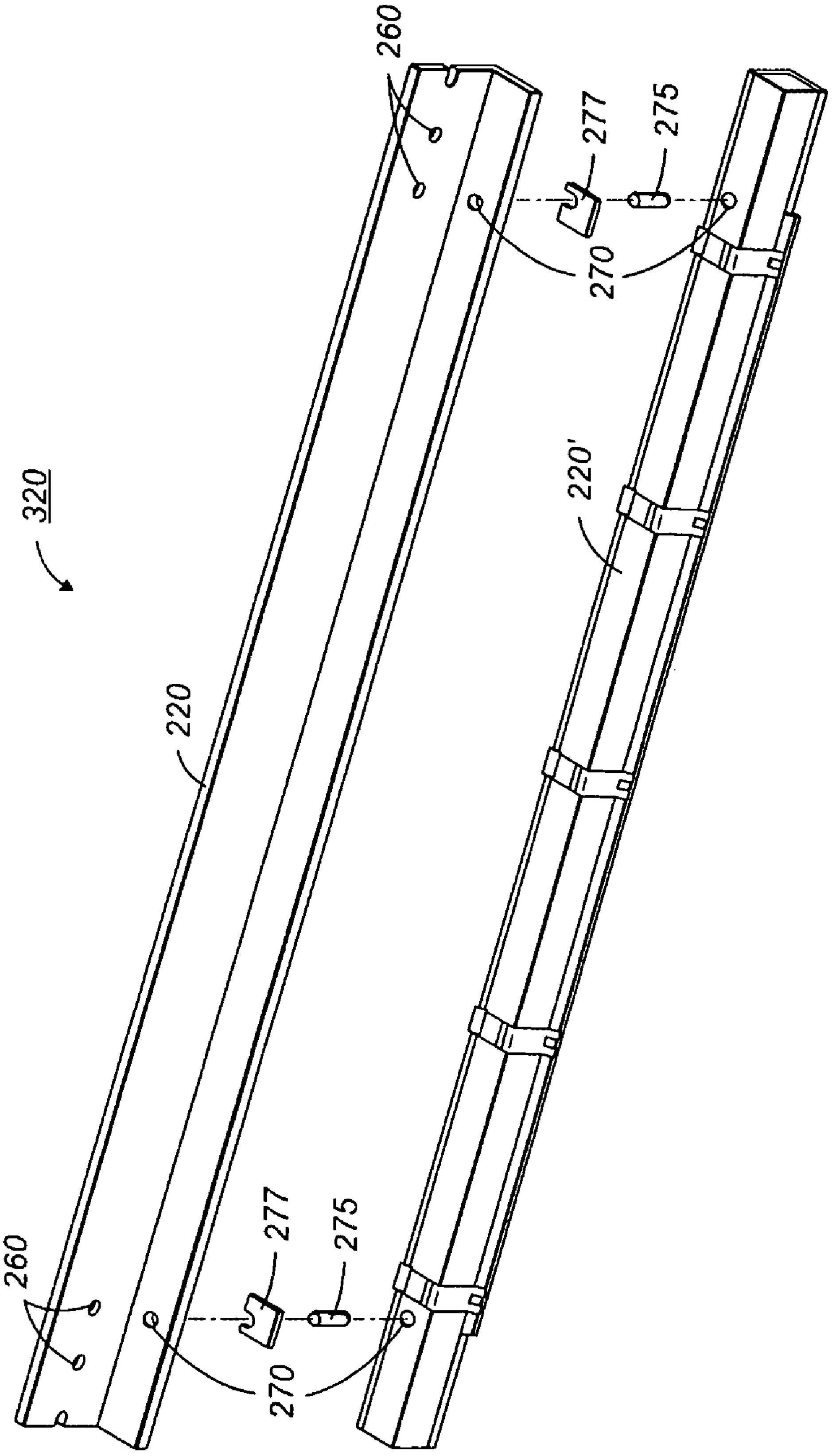
FIG. 6 is a drawing of an aspect of FIG. 5 showing an exploded view of a bar sub-assembly comprising an image bar, a mounting bracket, datum openings, datum pins and shims used for fixing factory adjustments with no further in-machine requirements in the field.
Figure 7:
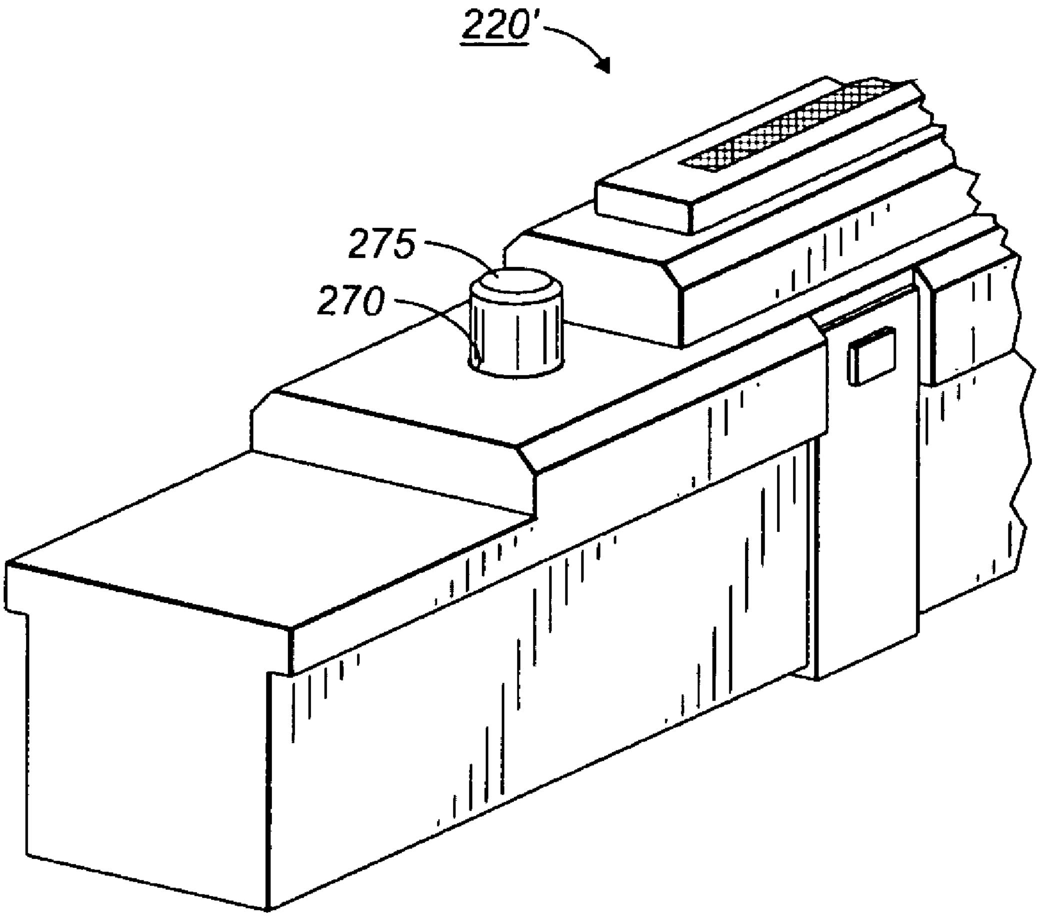
FIG. 7 is an enlarged drawing of a portion of an image bar of FIG. 6 showing a datum opening and pin used for alignment and adjustment of end-to-end pixel stitching between image bars.

Elevational view of the center bracket 220 and its associated image bar 220' is given in FIG. 6. Mounting bracket 220 has, for example, datum opening 260 on its vertically angled portion, as viewed in FIG. 6, to locate its mount position relative to the main datum structure 240. It also has, for example, a datum 270 on its horizontally oriented portion to locate the mount position of the image bar 220' onto the bracket itself. The image bar has a corresponding datum positioned relative to mounting bracket datum 270 and shares the same datum pin 275 (shown in the exploded view of FIG. 6). Datum pin 275, which acts as an alignment pin, is used to positionally locate image bar 220' with respect to the mounting bracket 220. A close up view of a portion of the image bar 220' and its associated datum pin 275 in its datum opening 270 is shown in FIG. 7. An opposing hole/pin combination may also be used on the reverse side (not shown) of the bar.

The placement of the datum holes/pins and the subsequent adjustment of sub-assemblies 310, 320 and 330 to provide the end-to-end pixel stitching for multiple RIBs are achieved through the superimposition of datum structure data obtained from each of the individual image bars and the width of the desired format on the photoreceptor. The datum structure data is related to the particular raster input bar that is being used for the printing system. For example, for a Sanyo™ image bar having a particular datum structure, represented generically by hole/pin location 270/275 shown in FIG. 7, the corresponding datum holes/pins on the mounting bracket and on the main datum structure are prepared accordingly. That is, sub-assemblies 310, 320 and 330 are adjustably positioned on the datum structure 240 based on the datums obtained off of the individual image bars 210', 220' and 230'. The final wide format ROB is assembled in the factory onto the datum structure from the individual sub-assemblies staggered to achieve a desired width format. No further in-machine adjustments are needed in the field.

An aspect of the present disclosure involves a method for mechanically adjusting staggered image bars in order to avoid output defects at the optical joints of such image bars, as described in reference to FIG. 3. The method illustrated in FIG. 5 provides a datum structure 240 having a first set of adjustable datum openings/pin 260/265. At least one mounting bracket, such as 210 or 220 or 230 is selected having a second set of datum openings/pins sharing the same reference numeral 260/265 and a third set of datum openings/pins 270/275 along with at least one image bar having a fourth set of datum openings sharing the same reference numeral 270/275. The image bar 220' is positioned and held on the mounting bracket 220 by inserting a first set of shared pins 275 through the aligned third and fourth set of shared datum openings 270. Shown in the exploded view of FIG. 6 are shims 277 which may also be used for fine tuning the alignment of the image bar 220' with its corresponding mounting bracket 220 to form the sub-assembly 320. The second set of shared pins 265 are aligned with the first set of adjustable datum openings/pins 260/265, such as shown in FIG. 5 on the datum structure 240. The mounting bracket 220 is mounted and held on the datum structure 240 by inserting a second set of shared pins 265 through the aligned second set of datum openings 260 on the mounting bracket 240 and through the first set of adjustable datum openings on the datum structure. The adjustability is provided by elongated openings. The positioning of the image bar 220' on the datum structure 240 is accomplished by slidably moving the second set of shared pins 265 of the bracket into the first set of adjustable datum openings 260 on the datum structure 240 until end-to-end pixel stitching adjustment is achieved among one or more image bars covering the whole length of the electrophotographic photoreceptor 200 shown in FIG. 5.

An aspect of the method described above provides the avoidance of output defects at the optical joints of image bars through mechanical adjustment of the image bars on the factory floor prior to the installation of the image bars. No further in-machine adjustments are needed in the field.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

What is claimed is:

1. A method of setting up an image bar for recording images in a scanner comprising:

providing a datum structure having a first set of adjustable datum openings;

selecting at least one mounting bracket having a second set of datum openings and a third set of datum openings;

selecting at least one image bar having a fourth set of datum openings;

aligning said fourth set of datum openings of said image bar with said third set of datum openings of said mounting bracket;

mounting and holding said image bar on said mounting bracket by inserting a first set of datum pins through said aligned fourth set of datum openings and third set of datum openings;

aligning said second set of datum openings with said first set of adjustable datum openings on said datum structure;

mounting and holding said mounting bracket on said datum structure by inserting a second set of datum pins through said aligned second set of datum openings on said mounting bracket and through said first set of adjustable datum openings on said datum structure; and positioning said image bar on said datum structure by slidably moving said second set of pins of said bracket in said first set of adjustable datum openings on said datum structure until end-to-end pixel stitching adjustment is achieved among one or more image bars covering the whole length of an electrophotographic photoreceptor.

2. The method in accordance with claim 1 further comprising:

adjusting staggered image bars to avoid output defects at optical joints of such image bars, said method comprising selecting and providing a datum structure to eliminate in-machine or in-system adjustments.

3. The method in accordance with claim 2, wherein said staggered image bars are mounted alternately on front and back surfaces of said datum structure.

4. The method in accordance with claim 2, wherein said adjusting comprises longitudinal adjustment of staggered image bars for end-to-end-pixel stitching between said image bars.

5. The method in accordance with claim 1, wherein said aligning of said datum openings of said image bar with said datum openings of said mounting bracket is accomplished by picking up datum data from said image bar.

6. The method in accordance with claim 1, wherein said aligning of said datum openings of said image bar with said datum openings of said mounting bracket is accomplished by picking up a first set of datum data from said image bar and superimposing the data on said mounting bracket.

7. The method in accordance with claim 6, wherein said datum data comprises the position of said fourth set of datum openings on said image bar.

8. The method in accordance with claim 1, wherein said positioning said image bar on said datum structure by sliding said second set of gins of said bracket in said first set of adjustable datum openings on said datum structure is accomplished by picking up a second set of datum data from an image bar spanning the whole length of said electrophotographic photoreceptor.

9. An apparatus for recording images comprising:

a datum structure having two ends and a front surface and a back surface configured to receive one or more image bar assemblies;

a roller assembly attached to said two ends of said datum structure said roller assembly configured to mate with a photoreceptor drum;

at least one mounting bracket having a first surface and a second surface said first surface configured to receive an image bar forming an image bar assembly;

wherein said one or more image bar assemblies are alternately mounted on said front and back surfaces of said datum structure at positions that provide longitudinal adjustment of end-to-end pixel stitching of said image bars over said photoreceptor drum.

10. The apparatus in accordance with claim 9, wherein said datum structure has a first set of datum openings configured to receive datum pins engaged to said one or more image bar assemblies.

11. The apparatus in accordance with claim 10, wherein said first set of datum openings on said datum structure has elongated portion to allow adjustable mounting of said image bar assemblies for end-to-end pixel stitching of image bars aligned over said photoreceptor.

12. The apparatus in accordance with claim 10, wherein said first set of datum openings comprise circular or polygonal shape.

13. The apparatus in accordance with claim 10, wherein said datum pins comprise circular or polygonal shape.

14. The apparatus in accordance with claim 9, wherein said datum structure comprises metal.

15. The apparatus in accordance with claim 9, wherein said datum structure comprises plastic.

16. The apparatus in accordance with claim 9, wherein said roller assembly comprises plastic.

17. The apparatus in accordance with claim 9, wherein said mounting bracket has a second set of datum openings configuredto receive datum pins engaged to said image bar.

18. The apparatus in accordance with claim 17, wherein said datum pins comprise plastic.

19. The apparatus in accordance with claim 17, wherein said second set of datum openings comprise circular or polygonal shape.

20. The apparatus in accordance with claim 9, wherein location of said first set of datum opening on said datum structure is determined by datum data obtained from dimensions of individual image bars positioned over said photoreceptor as well as datum data from an image bar spanning the whole length of said electrophotographic photoreceptor.

* * * * *